United States Patent
Veale et al.

(10) Patent No.: US 7,757,069 B2
(45) Date of Patent: Jul. 13, 2010

(54) CONFIGURATION STEERING FOR A RECONFIGURABLE SUPERSCALAR PROCESSOR

(75) Inventors: Brian F. Veale, Norman, OK (US); John K. Antonio, Norman, OK (US); Monte P. Tull, Oklahoma City, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 11/395,777

(22) Filed: Mar. 31, 2006

(65) Prior Publication Data

US 2006/0259749 A1    Nov. 16, 2006

Related U.S. Application Data

(60) Provisional application No. 60/666,975, filed on Mar. 31, 2005.

(51) Int. Cl.
*G06F 7/38*    (2006.01)
(52) U.S. Cl. ...................................................... 712/226
(58) Field of Classification Search .................. 712/226
See application file for complete search history.

(56) References Cited

U.S. PATENT DOCUMENTS

| 5,748,979 A * | 5/1998 | Trimberger | 712/37 |
| 6,308,256 B1 | 10/2001 | Folmsbee | |
| 2002/0013891 A1 | 1/2002 | Arnold et al. | |
| 2004/0025086 A1 * | 2/2004 | Gorday et al. | 714/37 |

OTHER PUBLICATIONS

Francisco Barat and Rudy Lauwereins, "Reconfiguarable Instruction Set Processors: A Survey," *Proceedings of the 11$^{th}$ International Workshop on Rapid System Prototyping*, Jun. 2000, pp. 168-173.
S.C. Goldstein, H. Schmit, M. Budlu, S. Cadambi, M. Moe, R.R. Taylor, "PipeRench: A Reconfigurable Architecture and Computer," *IEEE Computer*, vol. 33, No. 4, Apr. 2000, pp. 70-77.
J.R. Hauser and J. Wawrzynek, "Garp: A MIPS Processor with a Reconfigurable Coprocessor," *Proceedings of the 5$^{th}$ Annual IEEE Symposium on Field Programmable Custom Computing Machines*, 1997, pp. 12-21.

(Continued)

*Primary Examiner*—Eddie P Chan
*Assistant Examiner*—John Lindlof
(74) *Attorney, Agent, or Firm*—Dunlap Codding, P.C.

(57) ABSTRACT

A reconfigurable processor including a plurality of reconfigurable execution units, a memory, an instruction queue, a configuration selection unit, and a configuration loader. The memory stores a plurality of steering vector processing hardware configurations for configuring the reconfigurable execution units. The instruction queue stores a plurality of instructions to be executed by at least one of the reconfigurable execution units. The configuration selection unit analyzes the instructions stored in the instruction queue and chooses one of the steering vector processing hardware configurations. The configuration loader determines whether one of the reconfigurable slots is available and reconfigures at least one of the reconfigurable slots with at least a part of the chosen steering vector processing hardware configuration responsive to at least one of the reconfigurable slots being available.

23 Claims, 7 Drawing Sheets

OTHER PUBLICATIONS

C. Iseli and E. Sanchez, "Beyond Superscalar Using FPGAs," *Proceedings of the 1993 IEEE International Conference on Computer Design: VLSI in Computers and Processors*, 1993, pp. 486-490.

R. Razdan and M.D. Smith, "A High-Performance Microarchitecture with Hardware-Programmable Functional Units," *Proceedings of the 27th Annual International Symposium on Microarchitecture*, 1994, pp. 172-180.

C. Iseli and E. Sanchez, "A C++ Compiler for FPGA Custom Execution Units Synthesis," *Proceedings of the IEEE Symposium on Field Programmable Custom Computing Machines*, 1995, pp. 173-179.

Adronis Niyonkuru and Hans C. Zeidler, "Designing a Runtime Reconfigurable Processor for General Purpose Applications," *Reconfigurable Architectures Workshop, in Proceeding of the 18th International Symposium on Parallel and Distributed Processing*, Apr. 2004, pp. 143-149.

*Two Flows for Partial Reconfiguration: Module Based or Difference Based*, Xilinx Application Note No. XAAPP290, Version 1.2, Xilinx Inc., http://www.xilinx.com/bvdocs/appnotes/xapp290.pdf , Sep. 2004, pp. 1-28.

Mary D. Brown, Jared Stark, and Yale N. Patt, "Select-Free Instruction Scheduling Logic," *Proceedings of the 34th ACM/IEEE International Symposium on Microarchitecture*, Dec. 2001, pp. 1-10.

\* cited by examiner

Fig. 1

|  | Int-ALU | Int-MDU | LSU | FP-ALU | FP-MDU |
| --- | --- | --- | --- | --- | --- |
| FFUs | 1 | 1 | 1 | 1 | 1 |
| RFUs - Configuration 0 (Current) | 0 - 2 | 0 - 3 | 0 - 4 | 0 - 1 | 0 - 1 |
| RFUs - Configuration 1 | 1 | 1 | 4 | 0 | 0 |
| RFUs - Configuration 2 | 0 | 0 | 2 | 1 | 1 |
| RFUs - Configuration 3 | 2 | 2 | 0 | 0 | 0 |
| Resource Type Encoding, $t$ | $000_2$ | $001_2$ | $010_2$ | $011_2$ | $100_2$ |

*Table 1*

Fig. 2

$$Error = \left\lceil \frac{Req'd\# of\ Int\text{-}ALUs}{Avail\#\ of\ Int\text{-}ALUs} \right\rceil + \left\lceil \frac{Req'd\# of\ Int\text{-}MDUs}{Avail\#\ of\ Int\text{-}MDUs} \right\rceil + \left\lceil \frac{Req'd\# of\ LSUs}{Avail\#\ of\ LSUs} \right\rceil + \left\lceil \frac{Req'd\# of\ FP\text{-}ALUs}{Avail\#\ of\ FP\text{-}ALUs} \right\rceil + \left\lceil \frac{Req'd\# of\ FP\text{-}MDUs}{Avail\#\ of\ FP\text{-}MDUs} \right\rceil$$

|  | Execution Unit Required | | | | | Result Required From | | | | | | |
|---|---|---|---|---|---|---|---|---|---|---|---|---|
|  | Int-ALU | Int-MDU | LSU | FP-ALU | FP-MDU | Entry 1 | Entry 2 | Entry 3 | Entry 4 | Entry 5 | Entry 6 | Entry 7 |
| (Shift) Entry 1 | 1 | | | | | | | | | | | |
| (Sub) Entry 2 | 1 | | | | | 1 | | | | | | |
| (Add) Entry 3 | 1 | | | | | 1 | | | | | | |
| (Mul) Entry 4 | | 1 | | | | | 1 | | | | | |
| (Load) Entry 5 | | | 1 | | | | | | | | | |
| (FPMul) Entry 6 | | | | | 1 | | | | | 1 | | |
| (FPAdd) Entry 7 | | | | 1 | | | | | | | 1 | |

CONFIGURATION STEERING FOR A RECONFIGURABLE SUPERSCALAR PROCESSOR

CROSS-REFERENCE TO RELATED APPLICATIONS

The present patent application claims priority to the provisional patent application identified by U.S. Ser. No. 60/666,975, filed on Mar. 31, 2005 the entire content of which is hereby incorporated herein by reference.

STATEMENT REGARDING FEDERALLY SPONSORED RESEARCH AND DEVELOPMENT

Portions of the research on the present invention were funded by the Department of Education, pursuant to award number P200A80310.

BACKGROUND OF THE INVENTION

1. Field of the Invention

The present invention relates to novel designs of a configuration manager for a reconfigurable processor. More particularly, but not by way of limitation, the present invention relates to a configuration manager for a reconfigurable processor having a configuration loader determining whether one or more reconfigurable slots for reconfigurable execution units are available and reconfiguring at least one available reconfigurable slot with a chosen configuration.

2. Background of the Related Art

In contrast to a static processor, the architecture of the hardware and/or the instructions supported by a reconfigurable processor can be changed dynamically. This means that the type and quantity of circuitry implementing particular instructions, or functionality, can be changed after fabrication of the processor and even during execution. A main objective of this work is to increase the achieved instruction level parallelism of the processor by best matching the processor configuration to the instructions that are ready to be executed. The particular focus of the patent is on the design of a configuration manager for a reconfigurable superscalar processor.

There are three main paradigms for the design of reconfigurable processors; these paradigms are based on how the reconfigurable hardware of the processor is interfaced with other components of the architecture [1]. The three paradigms are: (1) attached processor, (2) co-processor, and (3) functional unit. In the attached processor paradigm, the reconfigurable hardware is connected to a host processor via an I/O bus (e.g., a PCI or OPB bus). A host processor controls the operation of the reconfigurable hardware via the bus; and/or data is transmitted between the reconfigurable hardware and the host processor using the bus [1]. An example of a system that uses the attached processor approach is PipeRench [2].

The co-processor paradigm attaches the reconfigurable hardware directly to the host processor in a fashion similar to a floating-point co-processor [1]. One example of this approach is Garp [3].

The final paradigm, the functional unit approach, integrates the reconfigurable hardware into the processor as a functional unit; reconfigurable function units are referred to as RFUs in [1]. OneChip98, SPYDER, and PRISC are examples of the RFU paradigm [1, 4, 5]. The architecture considered in this patent is in the RFU paradigm. One advantage of this paradigm is that it closely models the design of a traditional processor and many existing design concepts can be applied to such a processor.

Examples of previous work in the area of applying reconfigurable architectures to general-purpose computing requirements are SPYDER [4] and PRISC [5]. SPYDER uses a single RFU to implement hardware synthesized specifically for a program to be executed on the processor [4]. A C++ to netlist (a hardware description code) compiler that creates the binary configuration code used to configure the RFUs must be run before a program can be executed on SPYDER [6]. Thus, SPYDER requires that source code must be available and recompiled.

PRISC [5] is a reconfigurable processor similar in concept to SPYDER. A main difference between the two is that the reconfigurable resources in PRISC consist of multiple RFUs connected to the data path of the CPU along with static functional units [5]; SPYDER does not specify static functional units. For programs to utilize the reconfigurable resources of PRISC, they must be analyzed by a hardware extraction tool that determines what program code should be executed using the reconfigurable resources [5].

The SPYDER and PRISC processors represent an important step in applying reconfigurable computing to the realm of general-purpose computing; however, they may lack mainstream viability because they are not legacy-compatible at the level of binary code. Consider the vast amount of legacy software and hardware systems that dominate today's market.

Our motivation is to study general-purpose reconfigurable processors that can execute machine code compiled for current or legacy architectures. Research in this direction has already been undertaken in reference [7], where a general-purpose reconfigurable processor is proposed and modeled. The architecture introduced in reference [7] is based on a set of predefined configurable modules, each of which defines a different configuration of the reconfigurable functional units available in the architecture. These modules can be dynamically loaded at run-time to best match the needs of the instructions currently being executed by the processor. In order for such an approach to work efficiently, the configuration manager portion of the processor must be able to quickly determine the best configuration at any point in time based on the signature of the instructions in the instruction queue or buffer that are ready to be executed.

The work presented in this patent proposes a fast and efficient configuration selection circuit that performs the task assigned to the configuration manager in the architecture proposed in reference [7]. An overview of the architecture defined in reference [7] and the modifications and additions that our work assumes are presented and analyzed in Section 2. One aspect of the approach proposed here is that it uses a set of predefined modules, similar to those proposed in reference [7], and melds them into configurations of the functional units that best match the needs of the system at any given time using partial reconfiguration. The techniques presented in this patent can applied to other architectures in addition to the architecture of reference [7] and its modified version proposed here.

BRIEF DESCRIPTION OF THE SEVERAL VIEWS OF THE DRAWING

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

Table 1 illustrates a number of exemplary types of functional units, and their encodings, provided in fixed and reconfigurable portions of the reconfigurable architecture depicted in FIG. 1.

FIGS. 3(a), 3(b) and 3(c) cooperate to illustrate an exemplary method of generating configuration error metric values, more particularly.

DETAILED DESCRIPTION OF THE INVENTION

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

1. Overview of the Architecture

Figure 1:
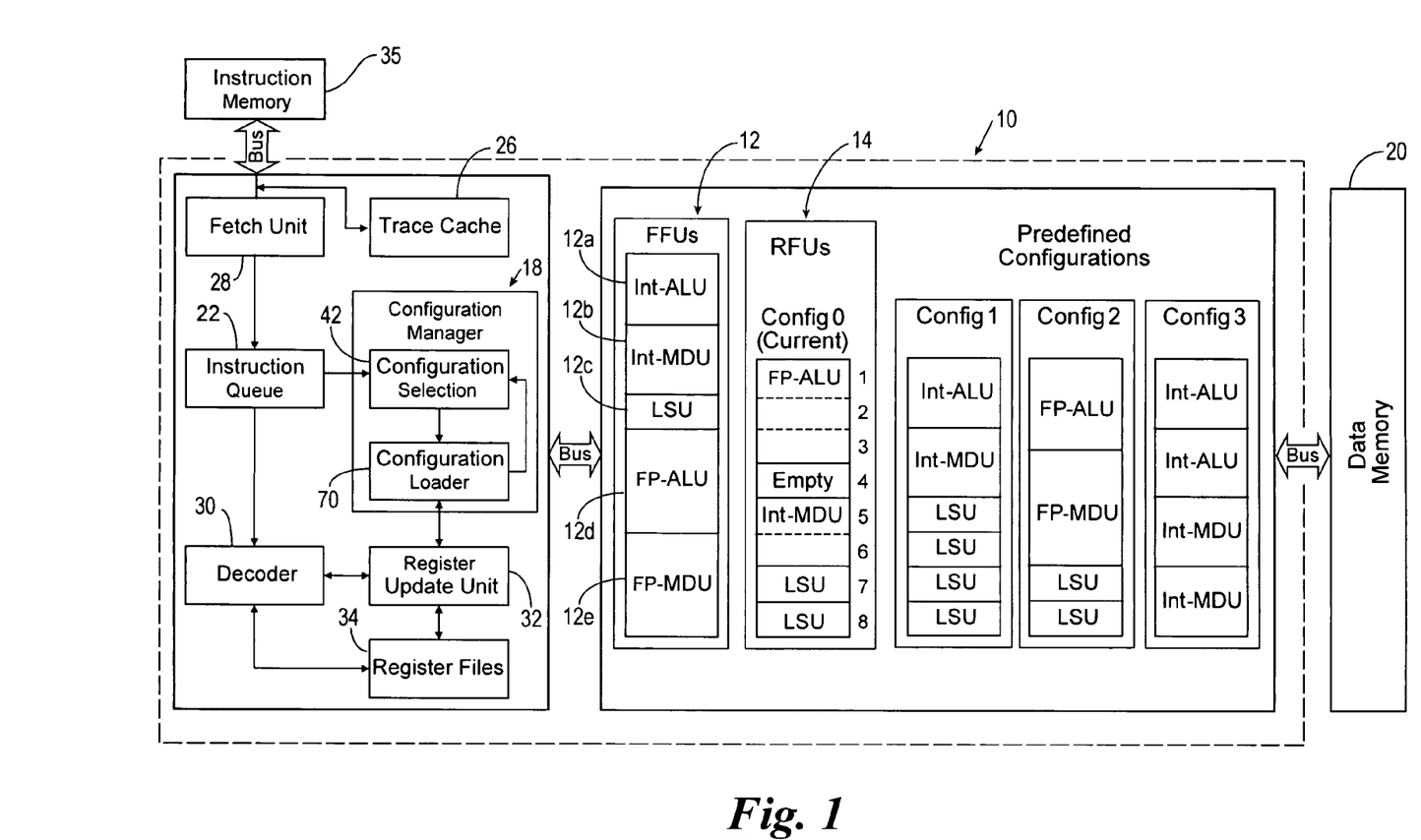
FIG. 1 is a block diagram illustrating a partially run-time reconfigurable architecture for a reconfigurable processor utilized in accordance with exemplary embodiments of the present invention.

Referring now to the drawings, and in particular to FIG. 1, shown therein and designated by a reference numeral 10 is an architecture for a reconfigurable superscalar processor (hereinafter referred to herein as "processor 10") constructed in accordance with the present invention. The processor 10 has one or more fixed functional (or execution) units 12, and one or more reconfigurable functional (or execution) units 14. The reconfigurable execution units 14 are implemented in reconfigurable hardware. By way of example, the processor 10 depicted in FIG. 1 is provided with five fixed execution units designated by the reference numerals 12a, 12b, 12c, 12d and 12e for purposes of clarity, and six reconfigurable execution units designated by the reference numerals 14a, 14b, 14c, 14d, 14e and 14f for purposes of clarity. It should be understood that the processor 10 can be provided with more or less fixed execution units 12 or reconfigurable execution units 14.

The overall configuration of the processor 10 is defined according to how its reconfigurable execution units 14 are configured. The processor 10 is provided with a configuration manager 18 which first selects the best matched among a plurality of steering configurations (e.g., stored in a data memory 20, or a special memory capable of fast "context switching") based on the number and type of reconfigurable or fixed execution units 14 and 12 required by instructions in an instruction queue or buffer 22. The instruction queue or buffer 22 is a data structure where instructions are lined up for execution. The order in which the processor 10 executes the instructions in the instruction queue or buffer 22 can vary and will depend upon a priority system being used.

In a preferred embodiment, configuration 0 (shown in FIG. 1 with the label "Config 0") is dynamically defined as the current configuration; the other configurations are statically predefined (three being shown in FIG. 1 for purposes of brevity and labeled as Config 1, Config 2 and Config 3). Once a steering configuration is selected, portions of it begin loading on corresponding reconfigurable execution units 14 that are not busy. For example, the steering configuration can begin loading into one or more slots of reconfigurable space for the benefit of one or more reconfigurable execution units 14. The active or current configuration of the processor 10 is generally the overlap of two or more steering configurations.

FIG. 1 shows the partially run-time reconfigurable architecture considered in this patent. Because some of the functional units of the processor 10 are reconfigurable, the architecture is within the RFU paradigm discussed in the previous section. A collection of five fixed functional units (FFUs) 12a-e and eight RFU "slots" are provided as an illustrative basis for the architecture discussed in this patent. The RFU slots are shown by way of example in FIG. 1 as configured to provide four RFUs 14 and with one reconfigurable slot empty. In the Example shown in FIG. 1, three of the reconfigurable slots are configured to provide a FP-ALU functional unit, two of the reconfigurable slots are configured to provide a Int-MDU functional unit, and two of the reconfigurable slots are configured to provide two LSU functional units. In general, the size of the smallest slot is preferably determined by the size of the smallest RFU 14 to be loaded. Preferably parts of the predefined configurations are loaded in contiguous reconfigurable slots matching the size requirements of the RFU. More or fewer FFUs 12 and/or RFU slots could be used without affecting the invention described here. As the processor 10 executes instructions, it reconfigures RFUs 14 that are not busy to best match the needs of the instructions that are in the instruction queue 22 and are ready to be executed.

The architecture given in FIG. 1 includes a plurality of predefined configurations for the reconfigurable functional units 14. In the example depicted in FIG. 1, four different predefined steering configurations are shown, i.e., the current steering configuration (indicated as Config 0), and three other predefined steering configurations (indicated as Config 1, Config 2 and Config 3) The RFUs 14 can be reconfigured independently of each other using partial reconfiguration techniques, thereby allowing the processor 10 to implement the current configuration (Config 0) that is a hybrid combination of the predefined configurations. Thus, the current configuration may or may not correspond exactly to one of the predefined steering configurations. Predefined steering configurations provide a basis for selecting a steering vector for the reconfiguration.

This approach is an extension of the teachings of reference [7] set forth below, where the use of partial reconfiguration at the level of the reconfigurable functional units 14 was not directly addressed. Also, the idea of implementing one of each type of functional unit in fixed hardware was not specified. However, the basic architectural structure assumed in this patent is similar to that described in reference [7].

Each predefined steering configuration specifies zero or more integer arithmetic/logic units (Int-ALU), integer multiply/divide units (Int-MDU), load/store units (LSU), floating-point arithmetic/logic units (FP-ALU), and/or floating-point multiply/divide units (FP-MDU). The types of execution units are not limited to these types and may consist of finer-grained units such as barrel shifters and specialized logic or arithmetic units, or coarser-grained units such as multiply and accumulate units. Table 1 is an exemplary break down of how many functional units of each type are provided by each steering configuration including the number of each that is provided as a fixed unit. It should be noted that the granularity of the functional units can be generalized to be either finer (e.g., smaller units) or coarser (e.g., larger units) than what is assumed here. For the purposes of the present description, it is assumed that each instruction is supported by exactly one type of functional unit. However, the invention also extends to situations in which two or more execution units are capable of executing a common instruction. Furthermore, for the discussion here, only one execution unit is assigned for the execution of each instruction and that unit handles all micro-operations necessary to execute that instruction, i.e., two or more different execution units are not required for the execution of any instruction. However, the invention also extends to this case as well.

In addition to the fixed functional units 12, the processor 10 is also provided with a plurality of fixed modules. In the example shown in FIG. 1, other fixed modules of the architecture provide the instruction queue 22, the data memory 20, a trace cache 26, an instruction fetch unit 28, an instruction decoder 30, a register update unit 32, a register file 34, an instruction memory 35 and the configuration manager 18. The instruction fetch unit 28 fetches instructions from the instruction memory 35 and provides them to the instruction queue 22. The configuration manager 18 preferably uses a unit decoder 40 similar to the pre-decoder of reference [7] to retrieve the instruction opcodes from the instruction queue 22. The instruction opcodes are then used to determine the functional unit resources required. The trace cache 26 is used to hold instructions that are frequently executed. As described in more detail in reference [7], the trace cache 26 and the pre-decoding unit 30 are used to determine the resources required to execute instructions at run time. As described in section 2 the configuration manager 18 includes a configuration selection unit 42 that matches instructions that are ready to be executed with the functional units they require and (partially) reconfigures the reconfigurable functional units of the processor 10 to match the needs of these instructions. This configuration selection unit 42 can be used (to fulfill the requirements) for the pre-decoders and configuration manager envisioned in reference [7].

The instructions (i.e. software) have long term storage in the instruction memory 35 (large memory space, but slow access). Instructions that are believed to be fetched in the near future are cached to the instruction queue 22. Instructions that are believed to be executed in the near future are fetched from the instruction memory 35 and placed into the instruction queue 22, where the configuration selection unit 42 uses these instructions in its decoding action.

The register update unit 32 collects decoded instructions from the instruction queue 22 and dispatches them to the various functional units 12 and 14 configured in the processor 10. The register update unit 32 also resolves all dependencies that occur between instructions and registers. A dependency buffer (not shown) is included in the register update unit 32 that keeps track of the dependencies between instructions and registers. The register update unit 32 writes computation results back to the register file during the write-back stage of instruction execution. Furthermore, the register update unit 32 allows the processor 10 to perform out-of-order execution of instructions, in-order completion of instructions, and operand forwarding see reference [7], for example.

2. Configuration Selection and Loading
2.1 Configuration Selection

Figure 2:
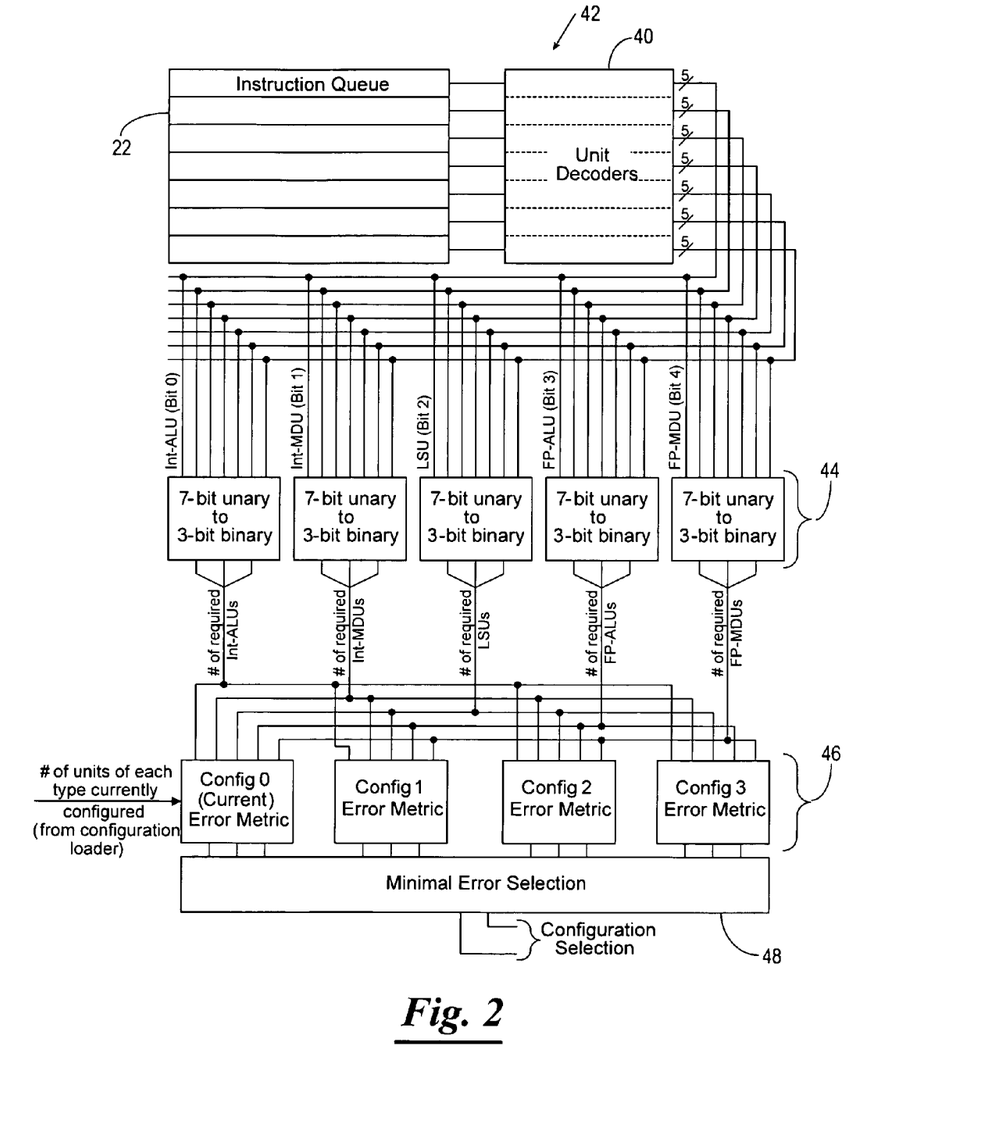
FIG. 2 is a block diagram of an exemplary configuration selection unit constructed in accordance with the present invention.

The configuration selection unit 42 is shown in FIG. 2. The configuration selection unit 42 inspects the instructions in the instruction queue 22 that are ready to be executed and chooses one of the plurality of steering configurations. In the example depicted in FIG. 1, three of the steering configurations are predefined steering configurations; the remaining steering configuration represents the currently active configuration (see Table 1). The current steering configuration may or may not correspond exactly to one of the predefined steering configurations because partial reconfiguration is employed when transitioning between configurations. Thus, the current configuration may be a hybrid combination of two or more predefined steering configurations. The configuration selection unit 42 considers the possibility that the current configuration may be better matched to the instructions requesting resources than any of the predefined steering configurations. In fact, achieving a stable and well-matched current steering configuration is desirable because it implies that the architecture has settled into a configuration state that matches the requirements of the code.

The configuration selection unit 42 consists of four stages: (1) the unit decoders 40, (2) resource requirements encoders 44, (3) configuration error metric generators 46, and (4) one or more minimal error selection units 48. The inputs to the minimal error selection unit 48 are the instruction queue 22 and one or more codes indicative of the number of each type of reconfigurable functional units 14 currently configured in the processor 10. The output of the minimal error selection unit 48 is a code, such as a two-bit value that indicates which of the steering configurations (e.g., three predefined RFU configurations or the current configuration) should be configured next. If more than four steering configurations are employed, then more than two bits would be required to encode the steering configurations, e.g., if selection is made from among five to eight configurations, then the minimal error selection unit 48 would output a three-bit value.

Figure 3A:
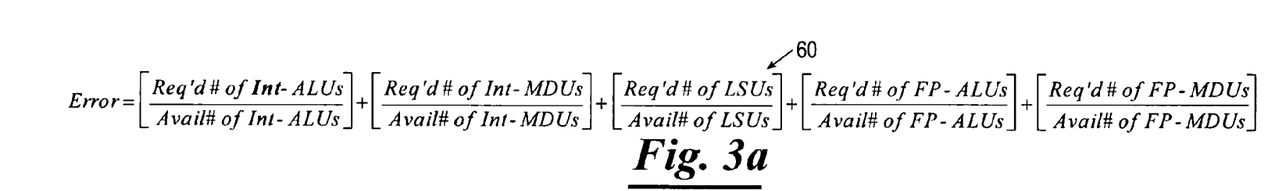
FIG. 3(a) is a diagram of an exemplary error metric equation.

The unit decoders 40 serve the same purpose as the pre-decoders of the original architecture specified in reference [7]. The unit decoders 40 retrieve the opcode of each instruction in the instruction queue 22 that is ready for execution. The output of each unit decoder 40 is preferably a one-hot vector that indicates the functional unit (i.e., reconfigurable or fixed or either) required by the instruction whose opcode the unit decoders 40 decoded. This information is collected from all unit decoders 40 and transformed into a three-bit binary value by the resource requirement encoders 44 that indicates how many functional units of each type, e.g., Int-ALU, Int-MDU, LSU, FP-ALU, and FP-MDU are required to execute a group, such as all, of the instructions in the instruction queue 22. The configuration error metric generators 46 then determine how close each of the three predefined configurations and the current configuration are to providing the resources required by the instructions in the instruction queue 22. Finally, the minimal error selection unit 48 (e.g., shown in FIG. 3(*c*)) uses the error associated with each configuration to choose the configuration that most closely meets the needs of the instructions in the instruction queue 22.

The configuration error metric generators 46 calculate an error metric value that indicates the error or "closeness" of the number and type of functional units (i.e., reconfigurable or fixed) required to execute the instructions in the instruction queue 22 relative to each of the four configurations; the FFUs are included in this calculation. The function that each error configuration metric generator 46 implements is defined by the equation given in FIG. 3(*a*).

Figure 3B:
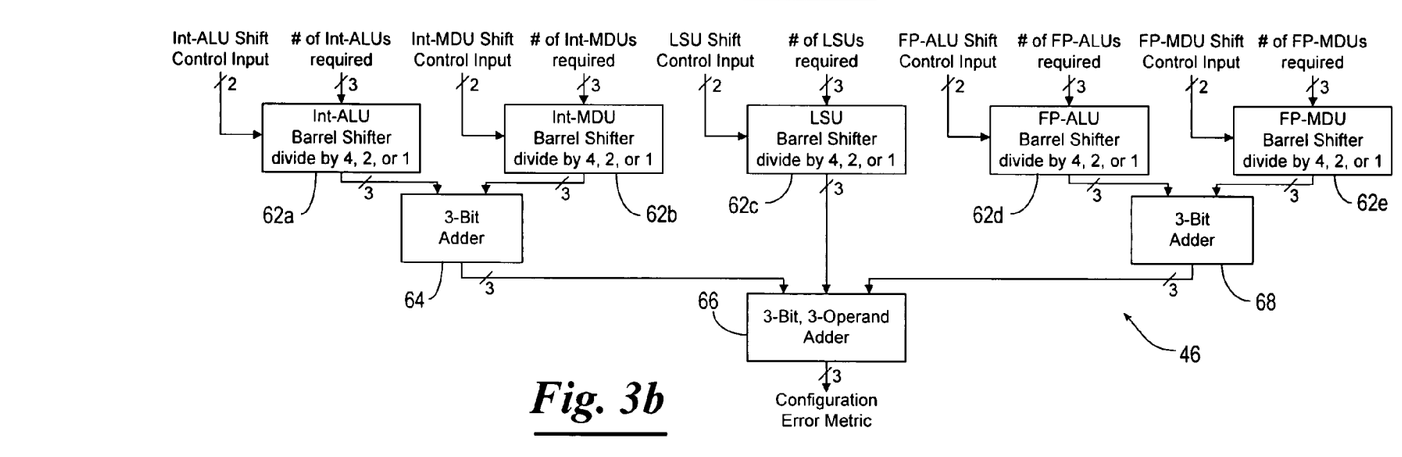
FIG. 3(b) is a schematic diagram of an exemplary error metric computation circuit.
Figure 3C:
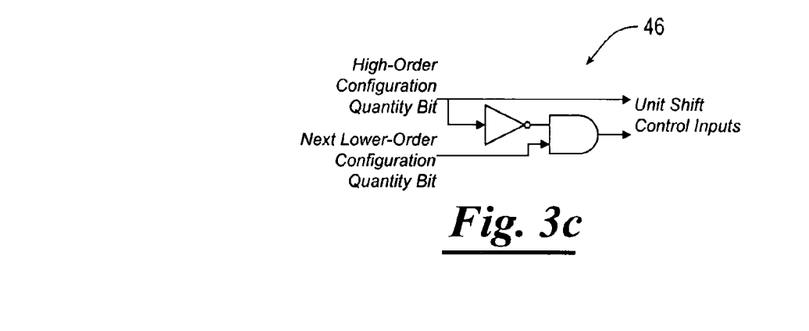
FIG. 3(c) is a schematic diagram of an exemplary circuit for the inputs to the shifter units.

The configuration error metric generators 46 (CEM) of FIG. 3(*b*) accept the quantified configuration resources for the predefined configurations, as well as the current configuration. The CEM 46 shown in FIG. 3(*b*) implements an equation 60 of FIG. 3(*a*) to produce the error metric value for each of the configurations, including the current configuration. The CEM 46 of FIG. 3(*b*) includes a plurality of combinational divider circuits 62 (five being shown and designated by the reference numerals 62*a*, 62*b*, 62*c*, 62*d* and 62*e*) to form the ratios in the equation 60 depicted in FIG. 3(*a*). In the example depicted in FIG. 3(*b*), the combinational divider circuits 62 are implemented with a plurality of barrel shifters which approximate the ratios by shifting (or not shifting which is divide by 1) the binary input to the right, thereby dividing the input by 2, 4, 8, etc. The barrel shifters depicted in FIG. 3(*b*) for the three or more predefined configurations can be arranged with hard-wired shift control inputs to divide by 4, 2, or 1, because the number of units associated with the divisor of each division calculation associated with these configurations are known, i.e., they are predefined. The barrel shifters for the current configuration use shift control inputs based on the upper two bits of the quantity of currently configured reconfigurable functional units 14.

FIG. 3(*b*) shows how the upper two bits are treated to approximate division of the functional unit requirement using 4, 2, or 1 as the divisor. A more accurate divider circuit could be implemented, if desired, at the expense of increased complexity and latency. Because the total number of fixed and reconfigurable functional units 12 and 14 required for this architecture does not exceed seven (the instruction queue 22 is assumed to hold seven instructions), three-bit adders 64, 66 and 68 are sufficient for summing the total error metric value. Employing a larger buffer would correspondingly require more bits for encoding and larger adder circuits.

The minimal error selection unit 48 of the configuration selection unit 42 chooses a configuration that achieves a minimal error by outputting an error metric value, for example, a two-bit binary value that represents the configuration that should begin loading. The novelty in this process is handling the case where a RFU 14 is currently executing a multi-cycle instruction, in this situation the loading of the selected configuration is not stalled, rather, reconfiguring the RFUs 14 that are not busy takes place.

In cases where the smallest configuration errors are equal, the minimal error selection unit 48 is designed to identify the configuration that requires the least amount of reconfiguration. Thus, if the error metric value for the current configuration is smallest, then it will ultimately be selected over a predefined configuration having the same error metric value. The current configuration is preferably favored over any predefined steering configuration that has the same error metric value. In a preferred embodiment, the current configuration is always favored over any predefined steering configuration that has the same error metric value because reconfiguration requires time overhead. If the current configuration does not achieve the minimal error metric value, and two or more predefined configurations do achieve the same minimal error metric value, then the predefined configuration ultimately selected will be the one that requires the least amount of reconfiguration relative to the current configuration.

2.2 Configuration Loading

The configuration selection unit 42 of FIG. 2 determines the configuration that should be loaded into the processor 10 to execute the instructions in the instruction queue 22 that have not been scheduled. If the configuration selection unit 42 chooses the current configuration, then the configuration loader 70 will not reconfigure any of the RFUs 14. Additionally, the configuration loader 70 tracks what type of functional unit is configured into each slot of reconfigurable hardware. This is handled by storing a resource allocation vector that contains this information. Each of the fixed or reconfigurable functional unit types supported by the architecture, e.g., Int-ALU, Int-MDU, LSU, FP-ALU, FPU-MDU, are given an encoding, such as a three-bit encoding, specified in Table 1. Because each reconfigurable functional unit 14 can occupy one or more slots of reconfigurable hardware available in the processor 10, a special encoding is used to indicate that a slot contains a portion of a functional unit that spans two or more slots. The first entry of the resource allocation vector for a unit that spans multiple slots contains that block's encoding, and the following entries contain, for example, the special encoding of $111_2$. Of course the number of bits in these encodings increase as necessary if more types of units are employed.

Once a configuration is chosen, the configuration loader 70 will determine which RFUs 14 need to be reconfigured. In one embodiment, the configuration loader 70 determines the difference (XOR) between the chosen configuration and the current configuration using the resource allocation vector. The configuration loader 70 will then choose which RFUs 14 to reconfigure on the basis of their availability. If the RFU 14 is executing a multi-cycle instruction, the RFU 14 cannot be reconfigured until the instruction finishes execution and is retired (and by the time it is available for reconfiguration, a different configuration may have been selected). To accommodate this approach, each slot has an available port that is asserted when the RFU 14 it implements is available, i.e., not busy. The configuration loader 70 can determine if a RFU 14 can be reconfigured by inspecting this output from the corresponding slot.

If the RFU 14 (and the slots it occupies) is available and it must be reconfigured to implement a new steering configuration, then the configuration loader 70 will reconfigure the slots for the RFU 14 to implement the functional unit specified by the chosen steering configuration. The RFU 14 will not be reconfigured if it already implements the specified functional unit (i.e., the type of the unit currently implemented in the RFU 14 matches the type specified in the chosen configuration). This reconfiguration is performed using partial reconfiguration techniques, such as those discussed in reference [8].

Due to the possibility that some RFUs 14 may be busy and not be reconfigured to implement a functional unit defined by the chosen steering configuration, certain instructions may not be able to execute for several cycles. This problem would be compounded if FFUs 12 were not provided as a part of the architecture and the processor 10 entered a state where certain functional units were not implemented for long periods of time. With the present architecture, the FFUs 12 desirably implement units for all instructions so that every instruction is guaranteed to execute. However, the processor 10 could be implemented without any FFUs 12.

3. Instruction Scheduling and Execution

An integral challenge in the design of a dynamically partial reconfigurable processor 10 is the scheduling, execution, and retirement of instructions. As the processor 10 changes the configuration of its RFUs 14 to best match the instructions being executed, the processor 10 must be able to determine what resources are available to support the execution of instructions. If the processor 10 chooses to schedule instructions for which there are not enough resources, then those instructions' execution can be delayed waiting for the required resources to become available.

To solve this problem, we employ a scheduling approach that preferably uses a wake-up array that allows instructions to "wake up" when the necessary functional units are available and required results from previous instructions are available, such as those arrays taught by reference [9]. This section discusses the basic approach and presents how the availability of RFUs 14 can be dynamically determined. Note that reference [9] presents a more sophisticated scheduling approach than discussed here; however, our approach can be extended using the same techniques that are employed in reference [9].

3.1 Scheduling Using Wake-Up Arrays

The wake-up array contains information that allows the scheduling logic to match the functional units that are not busy to instructions that are ready to execute. This includes determining if the instruction requires results from any previous instructions and verifying that the results from those previous instructions are available. Specifically, the wake-up array consists of a set of resource vectors that encode which functional unit an instruction requires and the instructions that must produce results before the instruction can be executed see reference [9], for example. An example of a dependency graph for a set of instructions and the corresponding wake-up array are presented in FIGS. 4 and 5. Note that there must be a "result required from" column in the array for each row (instruction entry) of the array. This column reflects the dependencies of subsequent instructions on any previous instructions.

Figure 4:
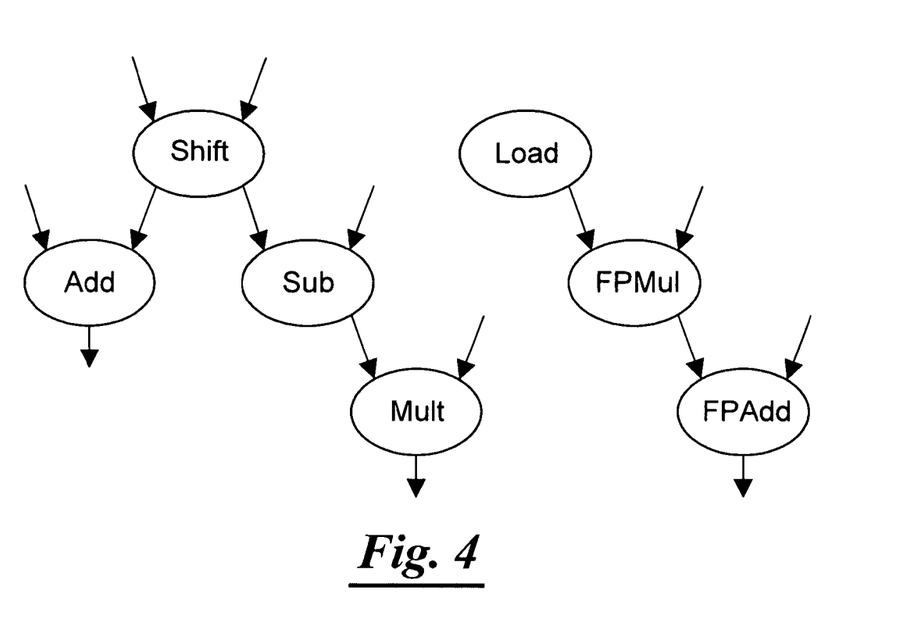
FIG. 4 is a dependency graph showing the dependencies between entries of the instruction queue.
Figure 5:
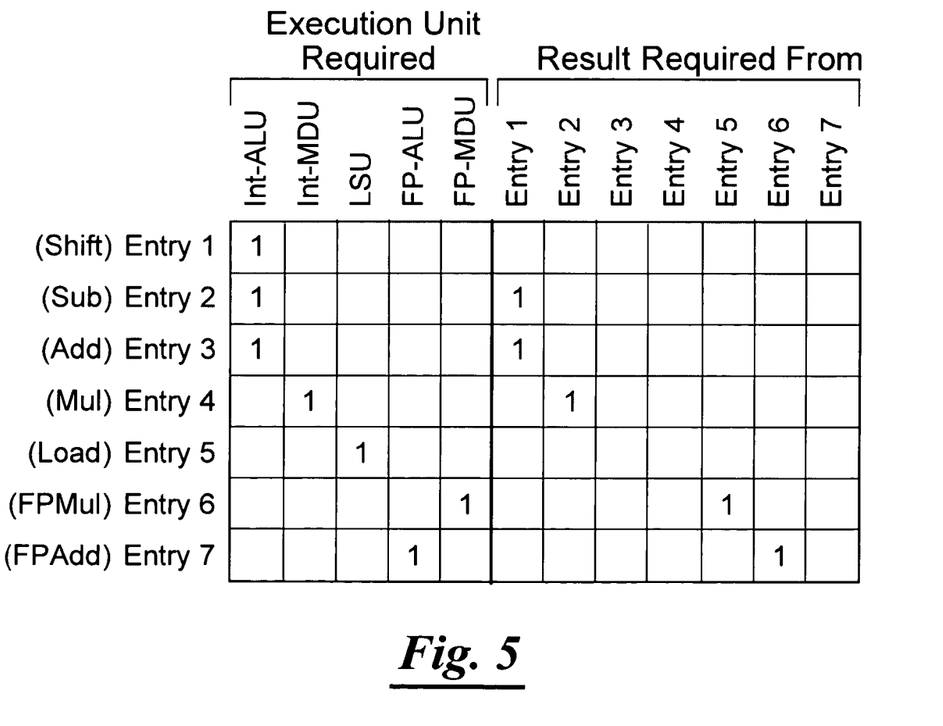
FIG. 5 is a wake-up array showing the entries for the instructions depicted in FIG. 4.

In the example of FIGS. 4 and 5, the Load instruction (Entry 5) only requires the load-store unit 12c, so only the resource bit for the load-store unit 12c is set on the row for the Load instruction. Additionally, the Load instruction does not depend on the result of any other instructions, so the column entries for the other instructions in the array are not set. Recall that for the RISC architecture assumed here, an instruction will never require more than one functional unit. In the current embodiment, it is assumed that each instruction requires one and only one functional unit to handle its entire execution. However, there are alternatives such as by connecting multiple execution units together to execute several instructions in a data-flow architecture. The Multiply instruction (Entry 4) uses an integer multiplier (Int-MDU) and requires a result from the Subtract instruction (Entry 3); therefore, the bits for Entry 4 are set in the columns for the Int-MDU unit and Entry 3.

Figure 6:
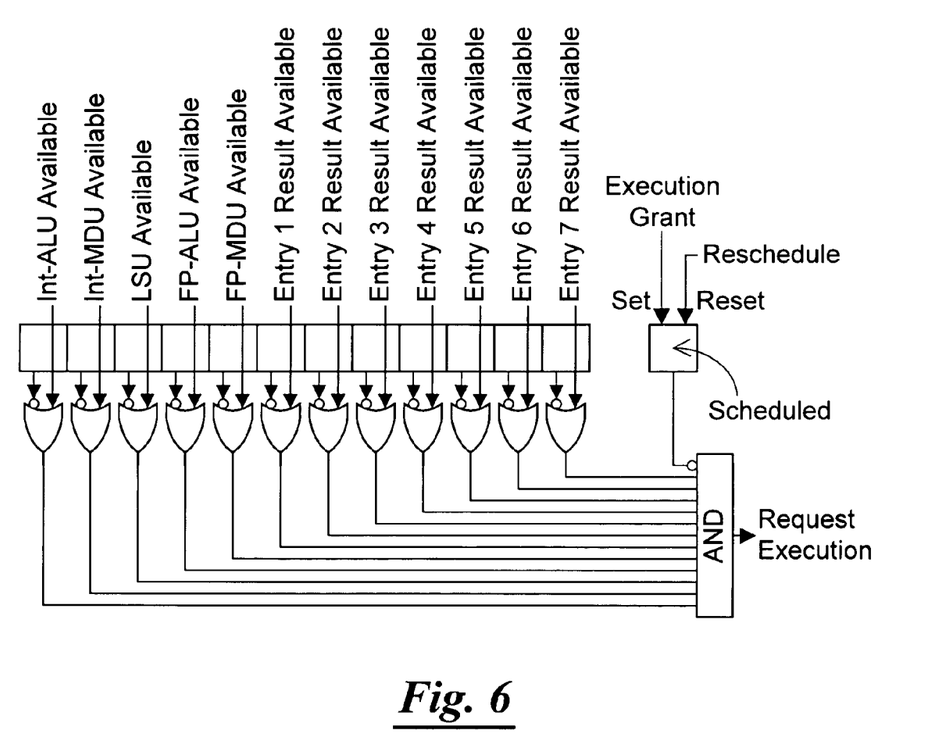
FIG. 6 is a logic flow diagram illustrating the logic associated with one resource vector of the wake-up array of FIG. 5.

FIG. 6 shows the logic associated with the wake-up array of FIG. 5 that determines if the instruction represented by each entry of the wake-up array should be considered for release by the scheduling logic. The wake-up logic only determines when an instruction is ready for execution and generates an execution request for those instructions that are ready and does not actually determine if an instruction is scheduled because multiple instructions could require the same resources. This contention between instructions must be handled by the scheduler after multiple instructions that use the same resources request execution.

The "available" lines shown in FIG. 6 indicate whether the corresponding resource or the results of the corresponding entry in the array are available; the value of each line is high if the resource/result is available. These lines pass through every entry in the array and enter an OR gate that checks if the resource/result is needed and available. See reference [9] for example. If the resource is not required, then the output of the OR gate must be high in order for the entry to be scheduled when the resources/entries that are required are available. Each of these results are ANDed together to ensure that every resource and entry required is available. See reference [9] for example. The logic required to compute resource availability in a static fixed logic processor having only FFUs 12 is more straightforward than for a reconfigurable processor having both FFUs 12 and RFUs 14 where the logic that determines the availability of a resource should desirably consider not only if the resource is busy but also if the resource is currently configured into the system. The scheduled bit, shown in FIG. 6, is required to keep an instruction from requesting execution once it has been scheduled, since instructions may take several cycles to complete. See reference [9] for example. Instruction entries in the wake-up array are not removed until the instruction is retired to keep instructions that rely on the result(s) of the instructions currently being executed from requesting execution too early. After an instruction receives an execution grant, its corresponding available line is asserted at the time that its result will be available. This can be handled using a count down timer that is set to the latency of the instruction. If the instruction has a latency of N cycles, the count down timer will be set to N−1; if the instruction has a one-cycle latency, the available line is asserted immediately. An instruction's timer will start once the instruction receives an instruction grant and the instruction's available line is asserted once the timer reaches a count of one. Once an instruction finishes execution and is retired, every wake-up array entry associated with the instruction is cleared to keep new instructions that are added to the wake-up array from incorrectly becoming dependent on the retired instruction. This approach also handles the case of an instruction being removed from the array before its dependent instructions are scheduled by allowing these instructions to request execution without considering a dependence on the retired instruction. If an instruction must be rescheduled, then the schedule bit is de-asserted using the reschedule input of the scheduled bit as described in reference [9].

3.2 Computation of Resource Availability

In order to use the wake-up array approach to scheduling instructions, the processor 10 must include logic that determines which functional units (resources in the wake-up array) are available. This can be handled by allowing each resource to assert whether it is available. If there are multiple resources of the same type, then their availability assertions must be ORed to ensure that the availability line in the wake-up logic for the resource is asserted. Determining if a resource is available is more difficult in a reconfigurable processor 10 because of the dynamic nature of which resources can be configured into the processor 10 at any given point in time.

The availability of a resource is a function of the allocation of the resource and availability of each copy of the resource that is configured into the processor 10. The availability of each resource can be determined using a signal from each slot of reconfigurable hardware that indicates if the functional unit it implements is busy or available. This availability signal is asserted when the functional unit is available. Equation 1 defines the calculation of an available function that determines if a functional unit of a particular type is available using the availability signal of each slot and the resource allocation vector provided by the configuration loader that specifies the type of functional unit implemented by each RFU 14 and FFU 12 provided in the processor 10. In Equation 1, type(i) refers to the encoding of a functional unit of type t, specified in Table 1.

$$\text{available}(t) = \sum_{\substack{i \in \text{resource} \\ \text{allocation vector}}} \left( \prod_{b \in [0,2]} \overline{(\text{type}(t)_b \oplus \text{type}(i)_b)} \right) \cdot \text{availability}(i) \quad (1)$$

Some functional units require more than one reconfigurable slot. From FIG. 1, we assume that LSUs 12c require one slot, Int units require two slots each, and each type of FP unit requires three slots. If a functional unit spans more than one reconfigurable slot, only one of the entries in the resource allocation vector will contain the encoding of the functional unit and the other entries will contain the encoding $111_2$ ensuring that the availability of the functional unit is only considered once in the calculation of the available function. Equation 1 can be realized in hardware using the circuit of FIG. 7.

Figure 7:
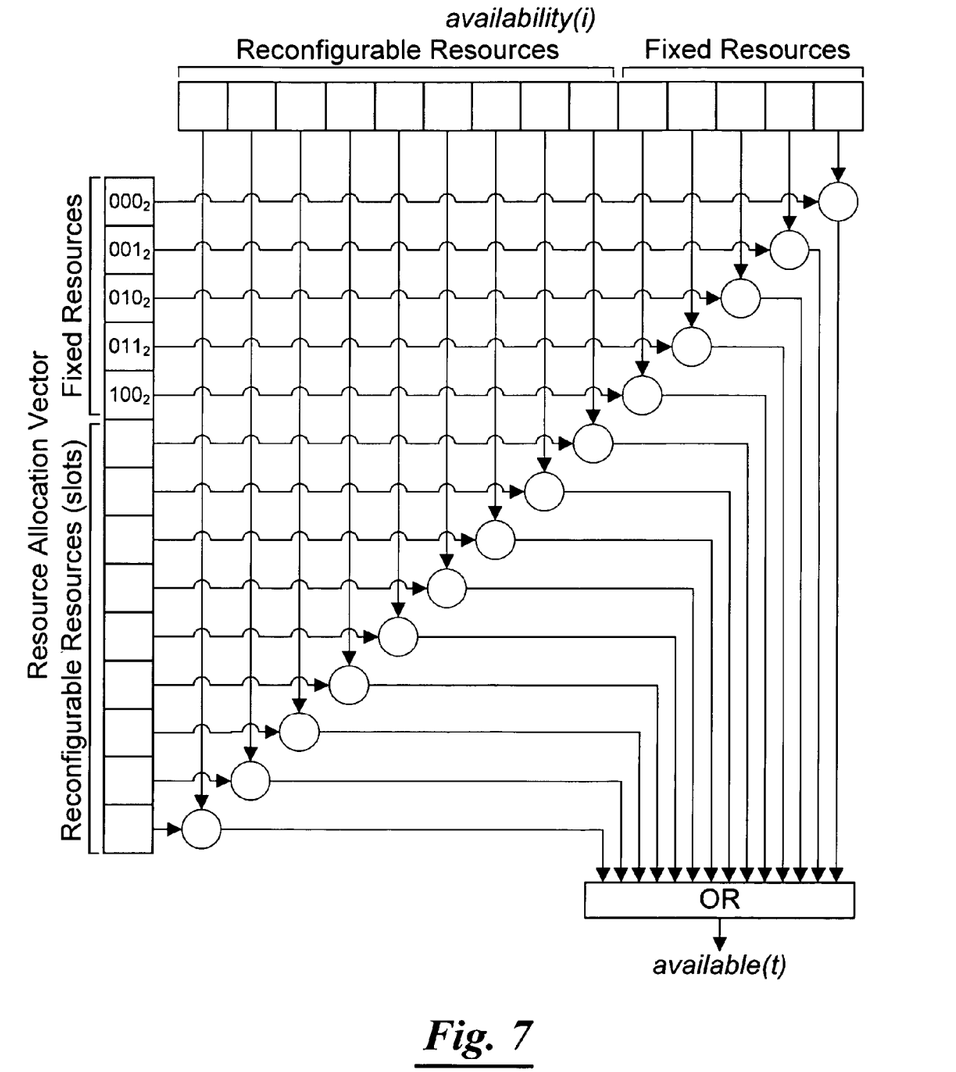
FIG. 7 is a schematic diagram of an exemplary circuit that computes the availability of a resource of type t as specified in Equation 1.

In FIG. 7, each bit of the resource allocation vector and the corresponding availability signal are applied to the product, $$\left( \prod_{b \in [0,2]} \overline{(\text{type}(t)_b \oplus \text{type}(i)_b)} \right) \cdot \text{availability}(i), \text{ computed by Equation 1.}$$

4. Conclusions

An approach to configuration management is introduced for a superscalar reconfigurable architecture having reconfigurable functional units and possibly fixed functional units. The technique proposed matches current requirements with a collection of predefined steering configurations, such as steering vector processing hardware configurations, and the current configuration. By employing partial configuration at the level of functional units, the approach effectively steers the current configuration in the direction specified by the best-matched steering configuration.

Designing the predefined steering configurations to be relatively orthogonal to one another may form the basis necessary to permit a large set of actual configurations that are actually realized, perhaps close to the entire set of possible processor configurations.

5. References

The following references are hereby incorporated herein by reference.

[1] Francisco Barat and Rudy Lauwereins, "Reconfigurable Instruction Set Processors: A Survey," *Proceedings of the 11th International Workshop on Rapid System Prototyping*, June 2000, pp. 168-173.

[2] S. C. Goldstein, H. Schmit, M. Budiu, S. Cadambi, M. Moe, R. R. Taylor, "PipeRench: A Reconfigurable Architecture and Compiler," *IEEE Computer*, Vol. 33, No. 4, April 2000, pp. 70-77.

[3] J. R. Hauser and J. Wawrzynek, "Garp: A MIPS Processor with a Reconfigurable Coprocessor," *Proceedings of the 5th Annual IEEE Symposium on Field Programmable Custom Computing Machines*, 1997, pp. 12-21.

[4] C. Iseli and E. Sanchez, "Beyond Superscalar Using FPGAs," *Proceedings of the 1993 IEEE International Conference on Computer Design: VLSI in Computers and Processors*, 1993, pp. 486-490.

[5] R. Razdan and M. D. Smith, "A High-Performance Microarchitecture with Hardware-Programmable Functional Units," *Proceedings of the 27th Annual International Symposium on Microarchitecture*, 1994, pp. 172-180.

[6] C. Iseli and E. Sanchez, "A C++ Compiler for FPGA Custom Execution Units Synthesis," *Proceedings of the IEEE Symposium on Field Programmable Custom Computing Machines*, 1995, pp. 173-179.

[7] Adronis Niyonkuru and Hans C. Zeidler, "Designing a Runtime Reconfigurable Processor for General Purpose Applications," *Reconfigurable Architectures Workshop, in Proceeding of the 18th International Symposium on Parallel and Distributed Processing*, April 2004, pp. 143-149.

[8] *Two Flows for Partial Reconfiguration: Module Based or Difference Based*, Xilinx Application Note No. XAPP290, Version 1.2, Xilinx Inc., http://www.xilinx.com/bvdocs/app-notes/xapp290.pdf, September 2004.

[9] Mary D. Brown, Jared Stark, and Yale N. Patt, "Select-Free Instruction Scheduling Logic," *Proceedings of the 34th ACM/IEEE International Symposium on Microarchitecture*, December 2001, pp. 204-213.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A reconfigurable processor, comprising:
a plurality of reconfigurable slots capable of forming reconfigurable execution units;
a memory storing a plurality of steering vector processing hardware configurations for configuring the reconfigurable execution units;
an instruction queue storing a plurality of instructions to be executed by at least one of the reconfigurable execution units;
a configuration selection unit analyzing the instructions stored in the instruction queue to determine an error metric value for at least two of the steering vector processing hardware configurations indicative of an ability of a reconfigurable slot configured with the steering vector processing hardware configuration to execute the instructions in the instruction queue and choosing the steering vector processing hardware configuration that most closely meets needs of the instructions in the instruction queue based upon the error metric values; and
a configuration loader determining whether one or more of the reconfigurable slots are available and reconfiguring at least one of the reconfigurable slots with at least a part of the chosen steering vector processing hardware configuration responsive to at least one of the reconfigurable slots being available.

2. The reconfigurable processor of claim 1, further comprising a plurality of fixed execution units, and wherein each fixed execution unit is capable of executing one or more instruction types.

3. The reconfigurable processor of claim 1, wherein the reconfigurable slots have a current configuration comprised of execution units currently configured into the reconfigurable slots and is dynamically represented as a steering vector processing hardware configuration, and wherein at least one of the other steering vector processing hardware configurations is statically predefined.

4. The reconfigurable processor of claim 3, wherein the current configuration is a hybrid combination of two or more predefined steering vector processing hardware configurations, achieved over time, by loading one or more execution unit configurations contained in the predefined steering vectors.

5. The reconfigurable processor of claim 1, wherein the configuration selection unit comprises:
   a plurality of unit decoders cooperating to retrieve an opcode of each instruction in the instruction queue that is ready for execution, and outputting a code indicating the type of functional unit required by the instruction whose opcode was decoded;
   a plurality of resource requirement encoders receiving the codes from the unit decoders and determining the number of functional units of each type that are required to execute a grouping of the instructions in the instruction queue;
   a plurality of configuration error metric generators cooperating to determine the error metric value for each of the steering vector processing hardware configurations;
   a minimal error selection unit receiving the error metric values and choosing the steering vector processing hardware configuration based on the error metric value determined by the error metric generators.

6. The reconfigurable processor of claim 5, wherein the grouping of the instructions in the instruction queue includes all of the instructions in the instruction queue.

7. The reconfigurable processor of claim 3, wherein the configuration selection unit determines an error metric value for the current configuration.

8. The reconfigurable processor of claim 5, wherein the configuration error metric generators include a plurality of combinational divider circuits with each of the combinational divider circuits being pre-assigned to a particular type of functional unit.

9. The reconfigurable processor of claim 8, wherein each of the combinational divider circuits receive a shift code and a code indicative of the number of functional units that are required to execute a grouping of the instructions in the instruction queue.

10. The reconfigurable processor of claim 9, wherein at least one of the combinational divider circuits include a barrel shifter.

11. The reconfigurable processor of claim 3, wherein the configuration selection unit favors the current configuration by not choosing to reconfigure any of the reconfigurable slots.

12. A reconfigurable processor, comprising:
   a plurality of fixed execution units;
   a plurality of reconfigurable slots capable of forming reconfigurable execution units;
   a memory storing a plurality of steering vector processing hardware configurations for configuring the reconfigurable execution units;
   an instruction buffer storing a plurality of instructions to be executed by at least one of the fixed and reconfigurable execution units;
   a configuration selection unit analyzing the instructions stored in the instruction buffer to determine an error metric value for at least two of the steering vector processing hardware configurations indicative of an ability of a reconfigurable slot configured with the steering vector processing hardware configuration to execute the instructions in the instruction buffer and choosing the steering vector processing hardware configuration that most closely meets needs of the instructions in the instruction buffer based on the error metric values; and
   a configuration loader determining whether one or more of the reconfigurable slots are available and reconfiguring at least one of the reconfigurable slots with at least part of the chosen steering vector processing hardware configuration responsive to at least one of the reconfigurable slots being available.

13. The reconfigurable processor of claim 12, wherein the reconfigurable slots have a current configuration comprised of execution units currently configured into the reconfigurable slots, and wherein at least one of the other steering vector processing hardware configurations is statically predefined.

14. The reconfigurable processor of claim 13, wherein the current configuration is a hybrid combination of two or more steering vector processing hardware configurations, achieved over time, by loading one or more execution unit configurations contained in the predefined steering vector processing hardware configurations.

15. The reconfigurable processor of claim 12, wherein the configuration selection unit comprises:
   a plurality of unit decoders cooperating to retrieve an opcode of each instruction in the instruction buffer that is ready for execution, and outputting a code indicating the type of functional unit required by the instruction whose opcode was decoded;
   a plurality of resource requirement encoders receiving the codes from the unit decoders and determining the number of functional units of each type that are required to execute a grouping of the instructions in the instruction buffer;
   a plurality of configuration error metric generators cooperating to determine the error metric value for each of the steering vector processing hardware configurations;
   a minimal error selection unit receiving the error metric values and choosing the steering vector processing hardware configuration based on the error metric value determined by the error metric generators.

16. The reconfigurable processor of claim 15, wherein the grouping of the instructions in the instruction buffer includes all of the instructions in the instruction buffer.

17. The reconfigurable processor of claim 13, wherein the configuration selection unit determines an error metric value for the current configuration.

18. The reconfigurable processor of claim 15, wherein the configuration error metric generators include a plurality of combinational divider circuits with each of the combinational divider circuits being pre-assigned to a particular type of functional unit.

19. The reconfigurable processor of claim 18, wherein each of the combinational divider circuits receive a shift code and a code indicative of the number of functional units that are required to execute a grouping of the instructions in the instruction buffer.

20. The reconfigurable processor of claim 19, wherein at least one of the combinational divider circuits include a barrel shifter.

21. The reconfigurable processor of claim 13, wherein the configuration selection unit favors a current configuration by not choosing to reconfigure any of the reconfigurable slots.

22. A method for reconfiguring a reconfigurable processor having at least one reconfigurable execution unit, comprising:
   analyzing instructions stored in an instruction queue to determine an error metric value for at least two steering vector processing hardware configurations indicative of an ability of a reconfigurable slot configured with the steering vector processing hardware configurations to execute the instructions in the instruction queue and choosing one of a plurality of predefined steering vector processing hardware configurations that most closely meets needs of the instructions in the instruction queue for reconfiguring at least one reconfigurable slot forming a reconfigurable execution unit to execute one or more of the instructions in the instruction queue based on the error metric values; and determining whether at least one of the reconfigurable slots are available and reconfiguring at least one reconfigurable slot with the chosen steering vector processing hardware configuration responsive to at least one of the reconfigurable slots being available.

23. A method for reconfiguring a reconfigurable processor having at least one reconfigurable execution unit, comprising:

analyzing instructions stored in an instruction buffer to determine an error metric value for each of a plurality of steering vector processing hardware configurations indicative of an ability of a reconfigurable slot configured with the steering vector processing hardware configuration to execute the instructions in the instruction buffer and choosing one of a plurality of predefined steering vector processing hardware configurations that most closely meets needs of the instructions stored in the instruction buffer for reconfiguring at least one reconfigurable slot forming a reconfigurable execution unit to execute one or more of the instructions in the instruction buffer; and determining whether at least one of the reconfigurable slots are available and reconfiguring at least one reconfigurable slot with the chosen steering vector processing hardware configuration responsive to at least one of the reconfigurable slots being available.

* * * * *